US012488565B2

(12) United States Patent
Darade et al.

(10) Patent No.: US 12,488,565 B2
(45) Date of Patent: Dec. 2, 2025

(54) CHARGING SYSTEMS AND METHODS FOR DETECTING AND IDENTIFYING A VEHICLE AND UTILIZING THIS INFORMATION IN A CHARGING APPLICATION

(71) Applicant: Rivian IP Holdings, LLC, Irvine, CA (US)

(72) Inventors: Nilesh Darade, Milpitas, CA (US); Dipesh Khakhkhar, Belmont, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 579 days.

(21) Appl. No.: 17/862,440

(22) Filed: Jul. 12, 2022

(65) Prior Publication Data

US 2024/0020947 A1 Jan. 18, 2024

(51) Int. Cl.
*G06V 10/764* (2022.01)
*B60L 53/62* (2019.01)
(Continued)

(52) U.S. Cl.
CPC ............ *G06V 10/764* (2022.01); *B60L 53/62* (2019.02); *B60L 53/65* (2019.02); *B60L 53/68* (2019.02); *G06Q 2240/00* (2013.01); *G06V 20/625* (2022.01); *G06V 2201/08* (2022.01); *H04L 67/12* (2013.01)

(58) Field of Classification Search
CPC .... G06V 2201/08; G06V 10/82; Y04S 30/12; Y04S 30/14; G06T 2207/20081; G06T 2207/20084
See application file for complete search history.

(56) References Cited

U.S. PATENT DOCUMENTS

2013/0193921 A1\* 8/2013 George .................. B60L 53/68
320/109
2016/0033288 A1\* 2/2016 Ueda ..................... H02J 7/0042
701/302
(Continued)

FOREIGN PATENT DOCUMENTS

KR 102034040 B1 \* 10/2019
KR 20220095751 A \* 7/2022
WO WO-2022123234 A1 \* 6/2022 ............. G06Q 10/02

*Primary Examiner* — Guillermo M Rivera-Martinez
(74) *Attorney, Agent, or Firm* — Foley & Lardner LLP

(57) ABSTRACT

A vehicle charging system and method, including: a charging station configured to selectively deliver charging power to a vehicle in an intelligent manner when connected; a perception sensor coupled to the charging station configured to obtain an image of the vehicle when present in proximity to the charging station; and memory storing instructions executed by a processor to identify the vehicle from the image of the vehicle using an artificial intelligence/machine learning algorithm, including, for example, identifying one or more of a make/model of the vehicle using a trained image recognition algorithm and a license plate number of the vehicle using a trained text recognition algorithm from the image of the vehicle. The vehicle charging system and method also control a charging parameter based on the determined identity of the vehicle, where the charging parameter includes, for example, a charging time, a charging power, a charging rule, a billing rate, and a charger provisioning scheme.

14 Claims, 6 Drawing Sheets

(51) Int. Cl.
 *B60L 53/65* (2019.01)
 *B60L 53/68* (2019.01)
 *G06V 20/62* (2022.01)
 *H04L 67/12* (2022.01)

(56) References Cited

U.S. PATENT DOCUMENTS

| | | | |
|---|---|---|---|
| 2017/0237944 A1* | 8/2017 | Haas | G06Q 20/145 |
| | | | 348/143 |
| 2018/0248394 A1* | 8/2018 | Kikuchi | B60L 53/37 |
| 2019/0031038 A1* | 1/2019 | Pursifull | G06Q 50/26 |
| 2019/0381908 A1* | 12/2019 | Joo | G06F 3/14 |
| 2020/0134590 A1* | 4/2020 | Glaser | B60L 53/665 |
| 2020/0148068 A1* | 5/2020 | Melatti | B60L 53/60 |
| 2020/0156493 A1* | 5/2020 | Li | H02J 7/007192 |
| 2020/0269835 A1* | 8/2020 | Hara | H04W 4/48 |
| 2021/0078420 A1* | 3/2021 | Lepage | B60L 53/16 |
| 2021/0394636 A1* | 12/2021 | Meyer | B60L 53/65 |
| 2022/0009368 A1* | 1/2022 | Li | H02J 7/00712 |

\* cited by examiner

CHARGING SYSTEMS AND METHODS FOR DETECTING AND IDENTIFYING A VEHICLE AND UTILIZING THIS INFORMATION IN A CHARGING APPLICATION

INTRODUCTION

The present disclosure relates generally to the automotive and vehicle charging fields. More particularly, the present disclosure relates to charging systems and methods for detecting and identifying a vehicle using computer vision and artificial intelligence (AI)/machine learning (ML) technologies and utilizing this information in a charging application.

Typically, at a public or private infrastructure charging station for a vehicle, the desired charging parameters, such as charging time or charge required, are specified by a user or communicated directly from a vehicle to the charging station via a wired or wireless connection, the latter of which may be coincident with the charging connection. Sometimes, when a vehicle is done charging at the charging station, a user unplugs the charging connector and leaves his or her vehicle in the associated parking area, potentially depriving other vehicles of the opportunity to charge at the charging station. It is desirable to charge such users an appropriate idle or parking fee, but it is often difficult to calculate such idle or parking fee after the user has unplugged the charging connector. Often, the charging station simply knows if the charging connector is coupled or uncoupled, and possibly whether or not a vehicle is present in the parking area in a generic sense, perhaps via a proximity sensor, but not much more.

It should be noted that this background is provided as illustrative context and environment only. It will be readily apparent to those of ordinary skill in the art that the principles of the present disclosure may be applied in other contexts and environments equally.

SUMMARY

The present disclosure provides a charging system and method that actually detects, identifies, and characterizes a vehicle present in a charging parking area, detecting the presence/absence of the vehicle, identifying the vehicle type (i.e., make, model, and license plate number), and determining the associated battery capacity and charge characteristics of the vehicle. Using this information, appropriate active/idle charges can be assessed, user preferences/priorities/perks can be effectively implemented, charging capacity can be properly provisioned to the charging station, and power output can be accurately delivered to the vehicle, promoting proper user charging etiquette and tailoring the charging session for the detected and identified vehicle in a robust manner. A camera and/or other perception sensor is/are coupled and/or disposed adjacent to the charging station and configured to detect the presence and obtain an image of the vehicle, from which the make, model, license plate number, etc. of the vehicle are determined using a trained image recognition AI/ML algorithm and/or a trained text recognition AL/ML algorithm. Charging/not charging (i.e., parking) determinations and the like can also be made from the image. Any level of information gathering refinement is possible. All processing may be done at the charging station itself or at a charging server in the cloud, with any number of connected databases available to obtain appropriate billing, preference/priority/perk, and charging characteristic information associated with the user and/or vehicle detected and identified.

In one illustrative embodiment, the present disclosure provides a vehicle charging system, including: a charging station configured to deliver charging power to a vehicle when connected to the charging station; a perception sensor coupled to the charging station configured to obtain an image of the vehicle when present in proximity to the charging station; and memory storing instructions executed by a processor to identify the vehicle from the image of the vehicle using an artificial intelligence/machine learning algorithm. The perception sensor includes one or more cameras, radars, lidars, and/or the like and the image (visual or point cloud) includes a single image, a plurality of images from different perspectives, or a plurality of successive images from the same or different perspectives (i.e., a video). The perception sensor is disposed one of within a housing of the charging station and remote from but adjacent to the housing of the charging station. The vehicle charging system may also include a proximity sensor coupled to the perception sensor configured to detect that the vehicle is present in proximity to the charging station and trigger the perception sensor to obtain the image of the vehicle. The memory is disposed in one of the charging station and a server disposed remotely from the charging station. Identifying the vehicle from the image of the vehicle includes identifying one or more of a make/model of the vehicle using a trained image recognition algorithm and a license plate number of the vehicle using a trained text recognition algorithm from the image of the vehicle. The vehicle charging system further includes memory storing instructions executed by a processor to control a charging parameter based on the determined identity of the vehicle, where the charging parameter includes one or more of a charging time, a charging power, a charging rule, a billing rate, and a charger provisioning scheme. Optionally, the vehicle charging system still further includes memory storing instructions executed by a processor to identify a user of the vehicle from the image of the vehicle using an artificial intelligence/machine learning algorithm and to control a charging parameter based on the determined identity of the user of the vehicle, where the charging parameter includes one or more of a charging rule and a billing rate. Optionally, the vehicle charging system still further includes memory storing instructions executed by a processor to identify a charging state of the vehicle (i.e., plugged-in/charging/not charging/unplugged) from the image of the vehicle using an artificial intelligence/machine learning algorithm and to control a charging parameter based on the determined charging state of the vehicle, where the charging parameter includes one or more of a charging time, a charging power, a billing rate, and a charger provisioning scheme.

In another illustrative embodiment, the present disclosure provides a vehicle charging method, including: given a charging station configured to deliver charging power to a vehicle when connected to the charging station, obtaining an image of the vehicle when present in proximity to the charging station using a perception sensor coupled to the charging station; and identifying the vehicle from the image of the vehicle using an artificial intelligence/machine learning algorithm. The perception sensor includes one or more cameras, radars, lidars, and/or the like and the image (visual or point cloud) includes a single image, a plurality of images from different perspectives, or a plurality of successive images from the same or different perspectives (i.e., a video). The perception sensor is disposed one of within a housing of the charging station and remote from but adjacent to the housing of the charging station. The vehicle charging method may also include detecting that the vehicle is present in proximity to the charging station and triggering the perception sensor to obtain the image of the vehicle using a proximity sensor coupled to the perception sensor. Identifying the vehicle from the image of the vehicle includes identifying one or more of a make/model of the vehicle using a trained image recognition algorithm and a license plate number of the vehicle using a trained text recognition algorithm from the image of the vehicle. The vehicle charging method further includes controlling a charging parameter based on the determined identity of the vehicle, where the charging parameter includes one or more of a charging time, a charging power, a charging rule, a billing rate, and a charger provisioning scheme. Optionally, the vehicle charging method still further includes identifying a user of the vehicle from the image of the vehicle using an artificial intelligence/machine learning algorithm and controlling a charging parameter based on the determined identity of the user of the vehicle, where the charging parameter includes one or more of a charging rule and a billing rate. Optionally, the vehicle charging method still further includes identifying a charging state of the vehicle (i.e., plugged-in/charging/not charging/unplugged) from the image of the vehicle using an artificial intelligence/machine learning algorithm and controlling a charging parameter based on the determined charging state of the vehicle, where the charging parameter includes one or more of a charging time, a charging power, a billing rate, and a charger provisioning scheme.

In a further illustrative embodiment, the present disclosure provides a non-transitory computer-readable medium including instructions stored in a memory and executed by a processor to carry out vehicle charging method steps including: given a charging station configured to deliver charging power to a vehicle when connected to the charging station, obtaining an image of the vehicle when present in proximity to the charging station using a perception sensor coupled to the charging station; and identifying the vehicle from the image of the vehicle using an artificial intelligence/machine learning algorithm. Identifying the vehicle from the image of the vehicle includes identifying one or more of a make/model of the vehicle using a trained image recognition algorithm and a license plate number of the vehicle using a trained text recognition algorithm from the image of the vehicle. The vehicle charging method steps further include controlling a charging parameter based on the determined identity of the vehicle, where the charging parameter includes one or more of a charging time, a charging power, a charging rule, a billing rate, and a charger provisioning scheme. Optionally, the vehicle charging method steps still further include identifying a user of the vehicle from the image of the vehicle using an artificial intelligence/machine learning algorithm and controlling a charging parameter based on the determined identity of the user of the vehicle, where the charging parameter includes one or more of a charging rule and a billing rate. Optionally, the vehicle charging method steps still further include identifying a charging state of the vehicle (i.e., plugged-in/charging/not charging/unplugged) from the image of the vehicle using an artificial intelligence/machine learning algorithm and controlling a charging parameter based on the determined charging state of the vehicle, where the charging parameter includes one or more of a charging time, a charging power, a billing rate, and a charger provisioning scheme.

BRIEF DESCRIPTION OF THE DRAWINGS

The present disclosure is illustrated and described with reference to the various drawings, in which like reference numbers are used to denote like system components/method steps, as appropriate, and in which.

DETAILED DESCRIPTION

The present disclosure provides a charging system and method that actually detects, identifies, and characterizes a vehicle present in a charging parking area, detecting the presence/absence of the vehicle, identifying the vehicle type (i.e., make, model, and license plate number), and determining the associated battery capacity and charge characteristics of the vehicle. Using this information, appropriate active/idle charges can be assessed, user preferences/priorities/perks can be effectively implemented, charging capacity can be properly provisioned to the charging station, and power output can be accurately delivered to the vehicle, promoting proper user charging etiquette and tailoring the charging session for the detected and identified vehicle in a robust manner. A camera and/or other perception sensor is/are coupled and/or disposed adjacent to the charging station and configured to detect the presence and obtain an image of the vehicle, from which the make, model, license plate number, etc. of the vehicle are determined using a trained image recognition AI/ML algorithm and/or a trained text recognition AL/ML algorithm. Charging/not charging (i.e., parking) determinations and the like can also be made from the image. Any level of information gathering refinement is possible, limited only by the granularity of the camera and intelligence of the algorithms utilized. All processing may be done at the charging station itself or at a charging server in the cloud, with any number of connected databases available to obtain appropriate billing, preference/priority/perk, and charging characteristic information associated with the user and/or vehicle detected and identified.

Figure 1:
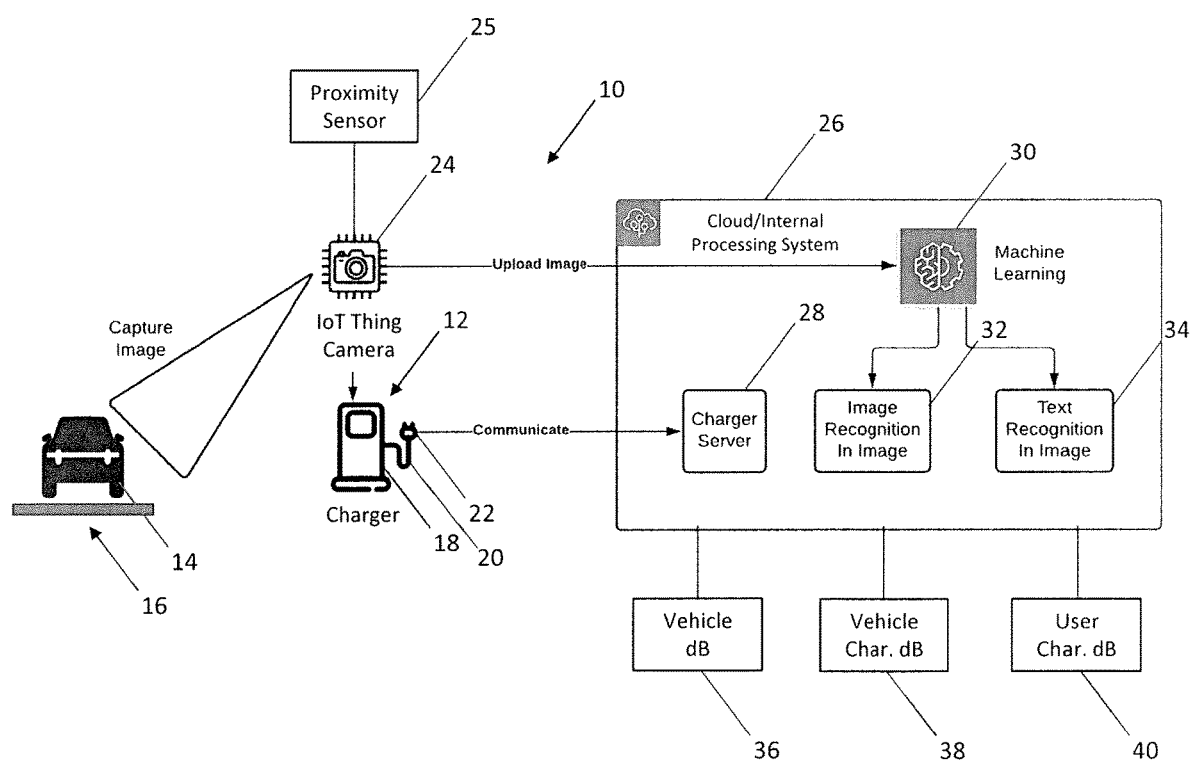
FIG. 1 is a schematic diagram illustrating one embodiment of the vehicle charging system of the present disclosure.

FIG. 1 is a schematic diagram illustrating one embodiment of the vehicle charging system 10 of the present disclosure. The vehicle charging system 10 includes a charge station or charger 12 that is selectively coupled to a vehicle 14 parked in a parking area 16 adjacent to the charger 12 charging the vehicle 14. Such charger 12, which may be part of the public infrastructure or a private system, is well known to those of ordinary skill in the art and is not described in greater detail herein, except to note that the charger 12 typically includes a housing 18 and is coupled to the vehicle 14 via a charge coupler 20 disposed at the end of a charge cable 22. At the end of a charging session, it is this charge coupler 20 that is hung back up on the housing 22 such that it may be used by a subsequent vehicle 14 parked in the parking area 16. Problems occur when a user finishes his or her charging session, but fails to vacate the parking area 16. In such situations, it is desirable to charge the user idle/parking fees for the inefficiency created and charging income opportunity sacrificed. This effectively imposes fair usage of a charging station for all users who need to charge a vehicle.

The vehicle charging system 10 also includes a perception sensor 24 positioned and configured to obtain an image of the parking area 16, the vehicle 14, and the charger 12 (and, optionally, the user and any other objects in the vicinity of the parking area). The perception sensor 24 includes one or more cameras, radars, lidars, and/or the like, all well known to those of ordinary skill in the art, and the image (visual or point cloud) includes a single image, a plurality of images from different perspectives, or a plurality of successive images from the same or different perspectives (i.e., a video). For the sake of simplicity, a camera 24 taking a visual image or video is used as the main example herein. The camera 24 may be disposed within or otherwise coupled to the housing 18 of the charger 12 or the camera 24 may be disposed separate from but adjacent to the housing 18 of the charger 12, provided the camera 24 has a clear view of the parking area 16, vehicle 14, and charger 12, with adequate resolution.

The vehicle charging system 10 may further include a proximity sensor 25, such as a radar sensor, an ultrasonic sensor, an optical sensor, a load sensor, or the like, coupled to the camera 24 configured to detect that the vehicle 14 is present in proximity to the charger 12, such as in or on the parking area 16, and trigger the camera 24 to obtain the image of the vehicle 14. This function may also be provided by the camera itself 24.

Once taken, the image is uploaded or otherwise provided to a cloud or internal processing system 26 associated with the charger 12, which may include a charger server 28 that generally controls the charging functions of the charger 12. The processing system 26 is configured to identify the vehicle 14 from the image of the vehicle 14. This includes identifying the make/model of the vehicle 14 using a trained image recognition algorithm 32 and, potentially, a license plate number of the vehicle 14 using a trained text recognition algorithm 34 from the image of the vehicle 14. The image recognition algorithm 32 and the text recognition algorithm 34 are both part of a general AI/ML module 30 designed to, based on a processed training data set, segment and identify a target within an image. Such image object detection and recognition algorithms are well known to those of ordinary skill in the art and may be trained for a variety of purposes. In the event that a license plate number is read, the processing system 26 may be in communication with a vehicle database 36 or the like such that a make/model can then be ascribed to the license plate number. Of course, the license plate number itself effectively identifies the vehicle 14 based on information stored in the vehicle database 36

The vehicle charging system 10, through the processing system 26 and/or charger server 28, is configured to control a charging parameter associated with a given charging session based on the determined identity of the vehicle 14, as well as the continued presence of the identified vehicle 14 in the parking area 16. For example, the processing system 26 may be in communication with a vehicle characteristic database 38 or the like such that battery capacity and characteristics can be determined for the identified make/model and the charging parameter controlled may thus be charging time, charging power, charger provisioning, etc. Likewise, the processing system 26 may be in communication with the vehicle characteristic database 38 or the like such that billing and/or vehicle preference/priority/perk characteristics can be determined for the identified vehicle 14 and the charging parameter controlled may thus be billing rate, charging priority, charging wait time, loyalty bonus points assigned, etc. Virtually any characteristics associated with a given charging session may be tailored based on the determined identity of the vehicle 14, as well as the continued presence of the identified vehicle 14 in the parking area 16, as any number of data stores may accessed to learn more about the identified vehicle 14 and tailor the charging session accordingly.

The vehicle charging system 10, through the processing system 26 and/or charger server 28, may also be configured to control a charging parameter associated with a given charging session based on the determined identity of the user of the vehicle 14, as well as the continued presence of the identified vehicle 14 in the parking area 16. For example, the processing system 26 may be in communication with a user characteristic database 40 or the like such that billing and/or user preference/priority/perk characteristics can be determined for the identified user and the charging parameter controlled may thus be billing rate, charging priority, charging wait time, loyalty bonus points assigned, etc. (all specific to the user, as opposed to the vehicle 14). Again, virtually any characteristics associated with a given charging session may be tailored based on the determined identity of the user, as well as the continued presence of the identified vehicle 14 in the parking area 16, as any number of data stores may accessed to learn more about the user and tailor the charging session accordingly.

The vehicle charging system 10, through the processing system 26 and/or charger server 28, may further be configured to control a charging parameter associated with a given charging session based on the observed charging state of the vehicle 14 (i.e., plugged-in/charging/not charging/unplugged). For example, the charging parameter controlled may be charging time, a charging power, billing rate (i.e., active/idle), charger provisioning, etc. Again, virtually any characteristics associated with a given charging session may be tailored based on the observed charging state of the vehicle 14.

Figure 2:
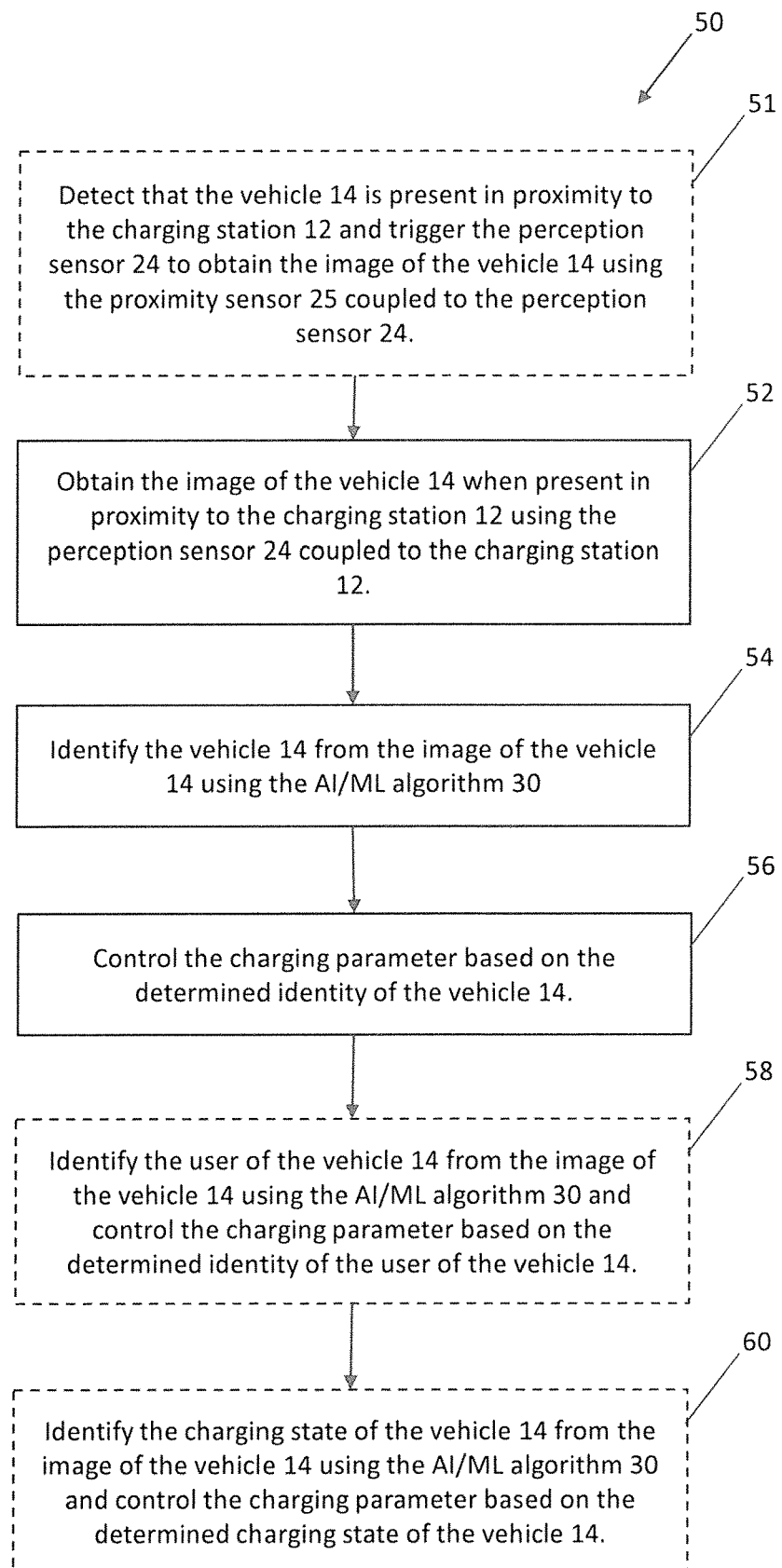
FIG. 2 is a schematic diagram illustrating one embodiment of the vehicle charging method of the present disclosure.

FIG. 2 is a schematic diagram illustrating one embodiment of the vehicle charging method 50 of the present disclosure. Also with reference to FIG. 1, given a charging station 12 configured to deliver charging power to a vehicle 14 when connected to the charging station 12, the method 50 typically first includes obtaining an image of the vehicle 14 when present in proximity to the charging station 12 using a perception sensor 24 coupled to the charging station 12 (step 52). The method 50 also includes identifying the vehicle 14 from the image of the vehicle 14 using an AI/ML algorithm 30 (step 54). Again, the perception sensor 24 includes one or more cameras, radars, lidars, and/or the like and the image (visual or point cloud) includes a single image, a plurality of images from different perspectives, or a plurality of successive images from the same or different perspectives (i.e., a video). The perception sensor 24 is disposed one of within a housing 18 of the charging station 12 and remote from but adjacent to the housing 18 of the charging station 12. The method 50 may also include detecting that the vehicle 14 is present in proximity to the charging station 12 and triggering the perception sensor 24 to obtain the image of the vehicle 14 using a proximity sensor 25 coupled to the perception sensor 24 (step 51). Identifying the vehicle 14 from the image of the vehicle 14 includes identifying one or more of a make/model of the vehicle 14 using a trained image recognition algorithm 32 and a license plate number of the vehicle using a trained text recognition algorithm 34 from the image of the vehicle 14. The method 50 further includes controlling a charging parameter based on the determined identity of the vehicle 14, where the charging parameter includes one or more of a charging time, a charging power, a charging rule, a billing rate, a charger provisioning scheme, etc. (step 56). Optionally, the method 50 still further includes identifying a user of the vehicle 14 from the image of the vehicle 14 using the AI/ML algorithm 30 and controlling a charging parameter based on the determined identity of the user of the vehicle 14, where the charging parameter includes one or more of a charging rule and a billing rate (step 58). Optionally, the method 50 still further includes identifying a charging state of the vehicle 14 (i.e., plugged-in/charging/not charging/unplugged) from the image of the vehicle 14 using the AI/ML algorithm 30 and controlling a charging parameter based on the determined charging state of the vehicle 14, where the charging parameter includes one or more of a charging time, a charging power, a billing rate, and a charger provisioning scheme (step 60).

Figure 3:
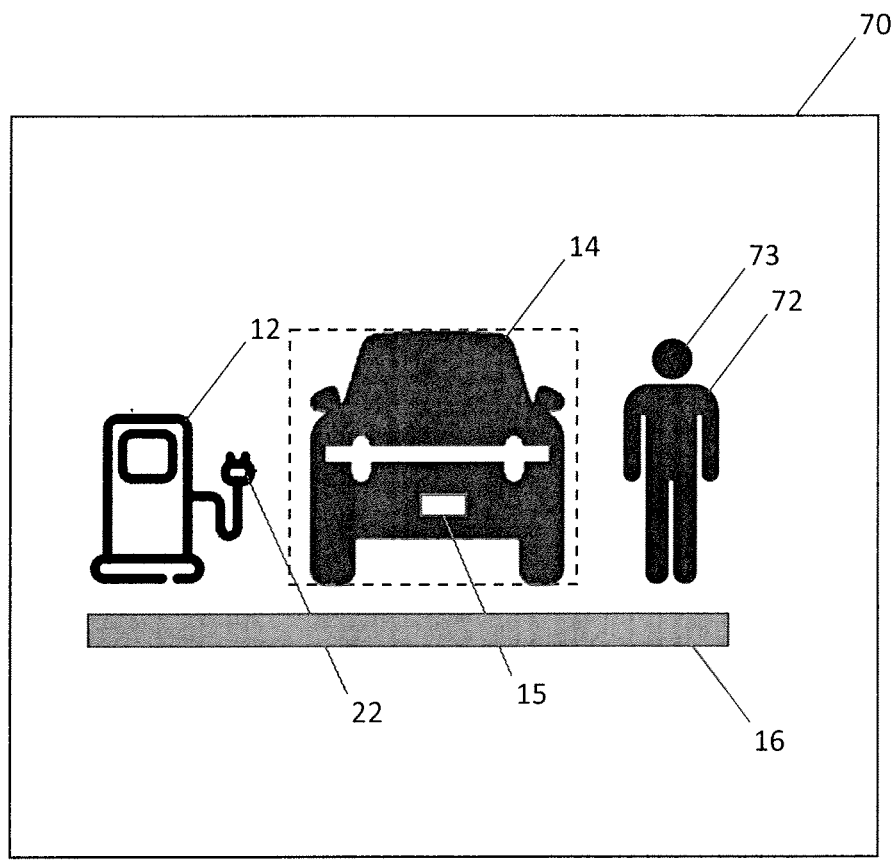
FIG. 3 is a schematic diagram illustrating some information that may be obtained from a camera image of a vehicle, user, and charging area using the vehicle charging system and method of the present disclosure.

FIG. 3 is a schematic diagram illustrating some information that may be obtained from a camera image 70 of a vehicle 14, user 72, and charging area 16 using the vehicle charging system 10 (FIG. 1) and method 50 (FIG. 2) of the present disclosure. In general, objects that can be segmented from the image 70 and subsequently identified, tracked, and/or used to tailor the charging process include, but are not limited to, the charger 12 and attached charge coupler 22, the vehicle 14, the license plate 15 of the vehicle 14, the user 72, and/or the face 73 of the user 72. As provided herein above, the image 70 (visual or point cloud) can include a single image, a plurality of images from different perspectives, or a plurality of successive images from the same or different perspectives (i.e., a video), without limitation.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 4:
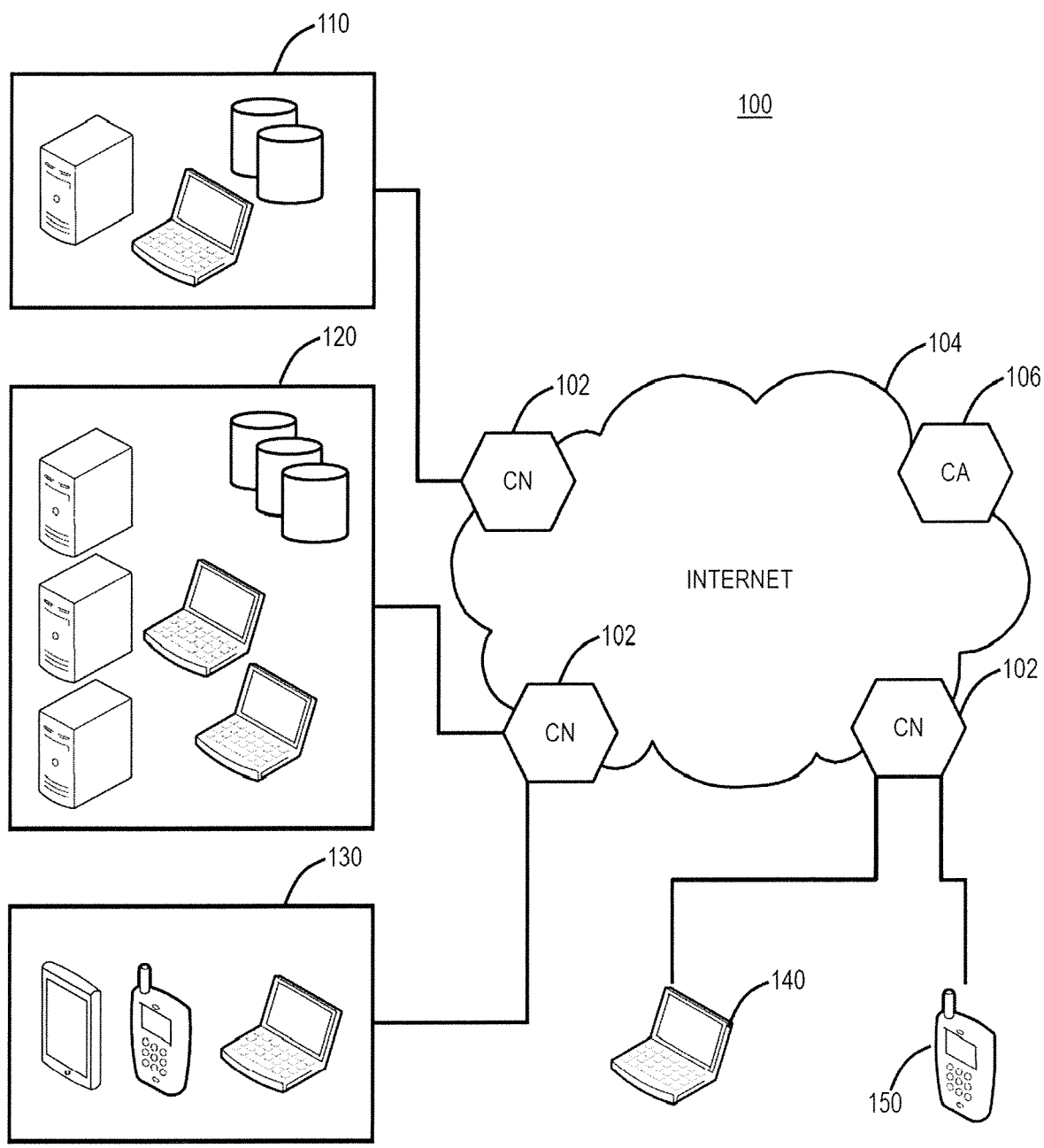
FIG. 4 is a network diagram of a cloud-based system for implementing the various algorithms and services of the present disclosure.
Figure 5:
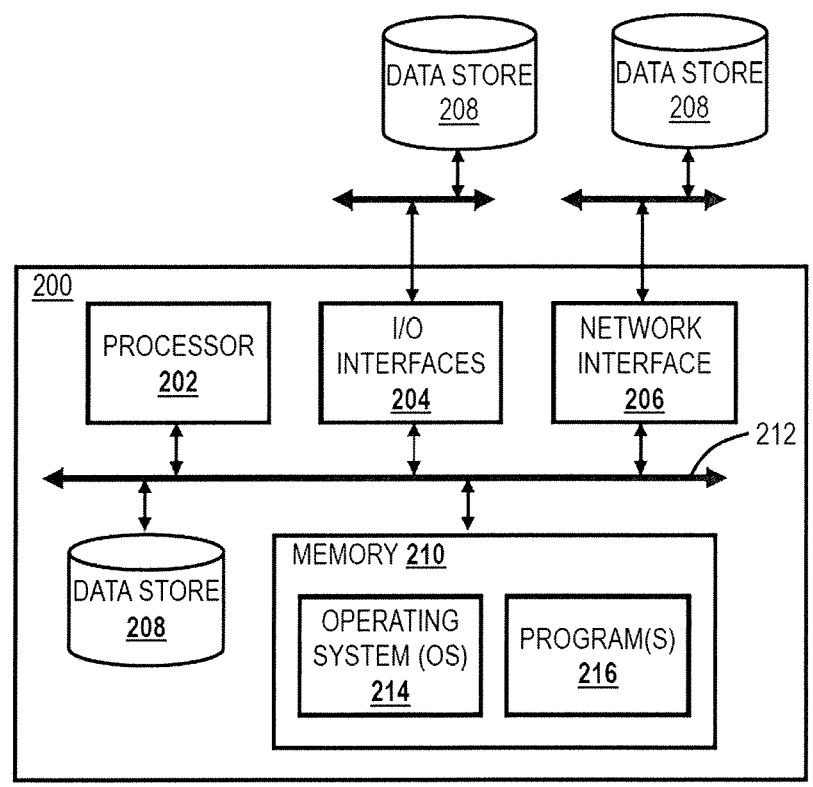
FIG. 5 is a block diagram of a server that may be used in the cloud-based system of FIG. 4 or stand-alone.

FIG. 4 is a network diagram of a cloud-based system 100 for implementing various cloud-based services of the present disclosure. The cloud-based system 100 includes one or more cloud nodes (CNs) 102 communicatively coupled to the Internet 104 or the like. The cloud nodes 102 may be implemented as a server 200 (as illustrated in FIG. 5) or the like and can be geographically diverse from one another, such as located at various data centers around the country or globe. Further, the cloud-based system 100 can include one or more central authority (CA) nodes 106, which similarly can be implemented as the server 200 and be connected to the CNs 102. For illustration purposes, the cloud-based system 100 can connect to a regional office 110, headquarters 120, various employee's homes 130, laptops/desktops 140, and mobile devices 150, each of which can be communicatively coupled to one of the CNs 102. These locations 110, 120, and 130, and devices 140 and 150 are shown for illustrative purposes, and those skilled in the art will recognize there are various access scenarios to the cloud-based system 100, all of which are contemplated herein. The devices 140 and 150 can be so-called road warriors, i.e., users off-site, on-the-road, etc. The cloud-based system 100 can be a private cloud, a public cloud, a combination of a private cloud and a public cloud (hybrid cloud), or the like.

Again, the cloud-based system 100 can provide any functionality through services, such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 110, 120, and 130 and devices 140 and 150. Previously, the Information Technology (IT) deployment model included enterprise resources and applications stored within an enterprise network (i.e., physical devices), behind a firewall, accessible by employees on site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein are not necessarily limited thereby.

FIG. 5 is a block diagram of a server 200, which may be used in the cloud-based system 100 (FIG. 4), in other systems, or stand-alone. For example, the CNs 102 (FIG. 4) and the central authority nodes 106 (FIG. 4) may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but is not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104 (FIG. 4). The network interface 206 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., a SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable medium having computer-readable code stored thereon for programming a computer, server, appliance, device, processor, circuit, etc. each of which may include a processor to perform functions as described and claimed herein. Examples of such computer-readable mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 6:
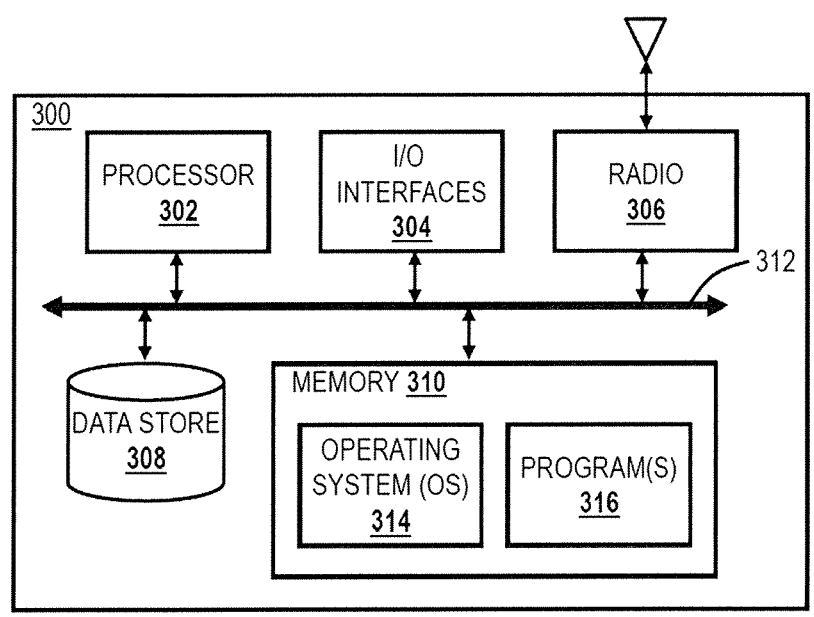
FIG. 6 is a block diagram of a user device that may be used in the cloud-based system of FIG. 4 or stand-alone.

FIG. 6 is a block diagram of a user device 300, which may be used in the cloud-based system 100 (FIG. 4), as part of a network, or stand-alone. Again, the user device 300 can be a vehicle, a smartphone, a tablet, a smartwatch, an Internet of Things (IoT) device, a laptop, a virtual reality (VR) headset, etc. The user device 300 can be a digital device that, in terms of hardware architecture, generally includes a processor 302, I/O interfaces 304, a radio 306, a data store 308, and memory 310. It should be appreciated by those of ordinary skill in the art that FIG. 5 depicts the user device 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example, but is not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

Again, the memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 6, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network, such as the cloud-based system 100 (FIG. 4).

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A vehicle charging system, comprising:
   a charging station configured to selectively deliver charging power to a vehicle when the vehicle is connected to the charging station;
   a perception sensor coupled to the charging station configured to obtain an image of the vehicle when the vehicle is present in proximity to the charging station; and
   memory storing instructions executed by a processor to:
      determine an identity of the vehicle and a charging state of the vehicle from the image of the vehicle using an artificial intelligence/machine learning algorithm; and
      apply, based on the identity of the vehicle, a charging parameter to control a charging time and the charging power to deliver to the vehicle according to the charging state determined from the image.

2. The vehicle charging system of claim 1, wherein the perception sensor comprises a camera that is one of disposed within a housing of the charging station or adjacent to the housing of the charging station.

3. The vehicle charging system of claim 1, further comprising a proximity sensor coupled to the perception sensor, and the proximity sensor configured to:
   detect that the vehicle is present in proximity to the charging station; and
   trigger the perception sensor to obtain the image of the vehicle.

4. The vehicle charging system of claim 1, wherein the memory is disposed in one of the charging station and a server disposed remotely from the charging station.

5. The vehicle charging system of claim 1, wherein determination of the identity of the vehicle from the image of the vehicle comprises identifying one or more of a make/model of the vehicle using a trained image recognition algorithm and a license plate number of the vehicle using a trained text recognition algorithm from the image of the vehicle.

6. The vehicle charging system of claim 1, further comprising the memory storing the instructions executed by the processor to;
   identify a user of the vehicle from the image of the vehicle using the artificial intelligence/machine learning algorithm; and
   control the charging parameter based on the identity of the user of the vehicle.

7. A vehicle charging method, comprising:
   given a charging station configured to selectively deliver charging power to a vehicle when the vehicle is connected to the charging station, obtaining, by a perception sensor, an image of the vehicle when the vehicle is present in proximity to the charging station, the perception sensor coupled to the charging station;
   determining, by a processor coupled with memory, an identity of the vehicle and a charging state of the vehicle from the image of the vehicle using an artificial intelligence/machine learning algorithm; and
   applying, by the processor, based on the identity of the vehicle, a charging parameter to control a charging time and the charging power to deliver to the vehicle according to the charging state determined from the image.

8. The vehicle charging method of claim 7, wherein the perception sensor comprises a camera that is one of disposed within a housing of the charging station or adjacent to the housing of the charging station.

9. The vehicle charging method of claim 7, further comprising:
- detecting, by a proximity sensor, that the vehicle is present in proximity to the charging station; and
- triggering, by the proximity sensor, the perception sensor to obtain the image of the vehicle, the proximity sensor coupled to the perception sensor.

10. The vehicle charging method of claim 7, wherein determining the identity of the vehicle from the image of the vehicle comprises:
- identifying, by the processor, one or more of a make/model of the vehicle using a trained image recognition algorithm; and
- identifying, by the processor, a license plate number of the vehicle using a trained text recognition algorithm from the image of the vehicle.

11. The vehicle charging method of claim 7, further comprising:
- identifying, by the processor, a user of the vehicle from the image of the vehicle using the artificial intelligence/machine learning algorithm; and
- controlling, by the processor, the charging parameter based on the identity of the user of the vehicle.

12. A non-transitory computer-readable medium comprising instructions stored in a memory and executed by a processor to carry out vehicle charging method steps comprising:
- given a charging station configured to selectively deliver charging power to a vehicle when the vehicle is connected to the charging station, obtaining an image of the vehicle when the vehicle is present in proximity to the charging station using a perception sensor coupled to the charging station;
- determining an identity of the vehicle and a charging state of the vehicle from the image of the vehicle using an artificial intelligence/machine learning algorithm; and
- applying, based on the identity of the vehicle, a charging parameter to control a charging time and the charging power to deliver to the vehicle according to the charging state determined from the image.

13. The non-transitory computer-readable medium of claim 12, wherein determining the identity of the vehicle from the image of the vehicle comprises:
- identifying one or more of a make/model of the vehicle using a trained image recognition algorithm; and
- identifying a license plate number of the vehicle using a trained text recognition algorithm from the image of the vehicle.

14. The non-transitory computer-readable medium of claim 12, wherein the vehicle charging method steps further comprise:
- identifying a user of the vehicle from the image of the vehicle using the artificial intelligence/machine learning algorithm; and
- controlling the charging parameter based on the identity of the user of the vehicle.

* * * * *